Aug. 13, 1940.  C. J. MALM ET AL  2,211,337
PREPARATION OF CELLULOSE FOR ETHERIFICATION
Filed April 30, 1937
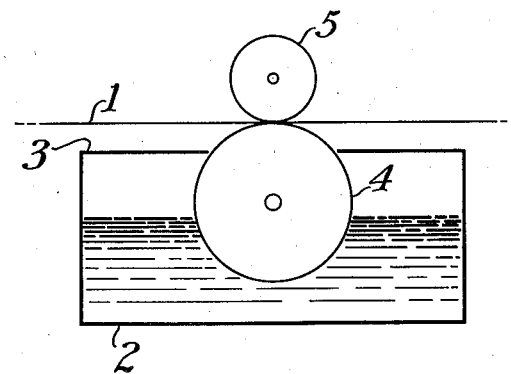
Carl J. Malm
Loring W. Blanchard, Jr.
INVENTORS
BY
ATTORNEYS Patented Aug. 13, 1940

2,211,337

UNITED STATES PATENT OFFICE 2,211,337

PREPARATION OF CELLULOSE FOR ETHERIFICATION

Carl J. Malm and Loring W. Blanchard, Jr., Rochester, N. Y., assignors to Eastman Kodak Company, Rochester, N. Y., a corporation of New Jersey Application April 30, 1937, Serial No. 140,006

3 Claims. (Cl. 260—231)

The present invention relates to the preparation of cellulose for etherification by contacting it while in sheet form with a surface which is moistened with a strong alkali solution.

Ordinarily, in the preparation of cellulose ethers, the cellulose is suspended in an alkali solution and, after it has become thoroughly impregnated, the excess alkali is pressed out. This, however, limits the minimum ratio of alkali solution retained in the cellulose to about 3:1 and thereby introduces a considerable amount of water into the reaction mixture. The presence of water in the reaction mixture promotes hydrolysis of the ethyl chloride, which is employed therein, and, therefore, it is desirable to restrict the amount of moisture to the minimum. We have found that it is possible to markedly restrict the ratio of alkali to cellulose and still get an efficient swelling of the cellulose, if it is used in sheet form, and this sheet is passed over a cylinder which is rotating in an alkali solution. The amount of alkali solution absorbed by the sheet depends upon the thickness of the sheet, the speed and diameter of the cylinder, the surface of the cylinder, and the distance between the surface of the solution and the top of the cylinder.

We have found that cellulose may be efficiently etherified if it takes up by our process as little as one part of 50% sodium hydroxide solution for every part of cellulose to produce the swelling action. If additional alkali is needed for the etherification, it may be added, as a powder. In this way the water content of the etherification mixture is kept at a minimum and, therefore, a very small amount of ethyl chloride, beyond the amount necessary for the etherification of the cellulose is consumed in the reaction. The alkali solution used is at, or near, the point of saturation, this also aiding in restricting the amount of moisture.

We have found, as a modification of this process, that, if the alkali solution is employed at an elevated temperature, it may be of a greater concentration and thereby will incorporate even more alkali into the cellulose, per unit of liquid, than will the process carried out at ordinary temperature. For instance, the alkali solution may be up to 70% concentration and after the cellulose has cooled, the sodium hydroxide will crystallize out and thereby come into intimate contact with the cellulose. If desired, especially in the case of a highly concentrated hot alkali solution, the sheet may be soaked therein after which it may be squeezed or wrung to remove the excess liquid therefrom. Due to the small amount of liquid, the alkali will crystallize directly in the sheet. It is preferable in this modification, in which the alkali solution is at an elevated temperature, that the sheet be cooled after it has been contacted with the warm alkali solution.

In the carrying out of our process, the sheet may be of the desired thickness, depending on the amount of alkali which is to be incorporated therein. If the sheet is run through several times, this procedure will also contribute to the more thorough impregnation of the sheet. The amount of alkali solution absorbed is increased by increasing the speed of rotation and by decreasing the diameter of the cylinder which is employed. The surface of the cylinder may be embossed. In this way the cellulose sheet is contacted with considerably more alkali than if the roll only had a plain surface.

After the cellulose has been treated, it may be wound into a roll and kept for a time, preferably with the exclusion of air or any other material which might cause the cellulose to degrade. In treating the sheet in this manner, the amount of alkali taken up may vary from ¼–2 parts of solution for every part of cellulose. After the sheet has been treated and wound in the form of a roll it is preferably placed in a closed container until ready for use.

Our method of preparing cellulose for etherification may be employed upon any type of cellulose, which can be formed into sheets having sufficient mechanical strength to be led over rollers and wound into a roll. At the present time cotton and refined wood pulp, such as refined sulfite pulp, are the most commonly employed materials for use in preparing cellulose derivatives and these are both suitable for use in a presoaking in accordance with our invention. Wood pulp is commonly prepared in sheet form and, therefore, due to its convenience, is particularly suitable for our process.

The figure illustrates an apparatus in which cellulose may be treated with alkali solution, in accordance with our invention. This apparatus consists of a vat of highly concentrated alkali 2, provided with a cover 3, with an opening sufficient for the top of the treating wheel 4 to protrude. It is preferred that there be an idle roll 5 directly above the treating wheel 4 to ride upon the surface of the cellulose sheet 1 and thus assure a good contact between the sheet and the alkali solution present on the roll 4. If desired, the roll 4 can extend further into the solution and thereby present a greater amount of alkali to the sheet as it passes thereover. The surface of this roll 4 may be irregular, rough or embossed so as to present a greater amount of alkali to the sheet. The cellulose sheet 1 in passing over the roll exerts a blotting effect thereon and in this manner takes up the alkali and distributes it throughout the sheet.

If the use of a heated solution is desired, warming means may be provided, such as a jacket around the vessel 2 which contains the alkali solution or by heating the roll 4. After the cellulose has been thus treated, it may be kept either in an air-tight container prior to use or it may be used shortly after the treatment. In using the sheet for etherification, it is placed in the reaction vessel with the desired amount of ethyl chloride and, if necessary, an additional amount of alkali. The thickness of the sheet will depend upon the fancy of the individual operator. For instance, it may be .01 inch thick or, if desired, much thicker. If a thick sheet is used or if the cylinder does not carry much solution, it might be desirable to repeat the operation inverting the cellulose sheet so that the side which did not contact the wetting roll in the first treatment may be alkali-treated. The following examples illustrate the treatment of cellulose with alkali in accordance with my invention:

Example I 150 pounds of wood pulp sheet was passed over a stainless steel cylinder rotating in a bath containing a 40% sodium hydroxide solution. The sheet absorbed 200 pounds of the solution. This sheet was put into an autoclave and 100 pounds of powdered alkali and approximately 1350 pounds of ethyl chloride was added thereto. The reaction was carried out for four hours at 120° C. and a solution of the ether was obtained. The ether was separated therefrom by precipitation, washing and drying and was found to have an ethoxyl content of 40.3%.

Example II

Example I was repeated except that 225 pounds of 40% alkali solution was absorbed by this sheet and 210 pounds of powdered alkali was added in the etherification step.

Example III 150 pounds of cellulose sheet was permitted to absorb only 180 pounds of the alkali solution. For the etherification 230 pounds of powdered alkali and approximately 1350 pounds of ethyl chloride was added. The product obtained contained 46.8% ethoxyl.

Example IV

A sheet of refined wood pulp, weighing 150 pounds, was passed over a stainless steel roll rotating in a 65% sodium hydroxide solution maintained at 70° C. The operation was repeated the second time with the opposite side of the sheet against the roll. The mass was then cooled to 20° C. The weight of the absorbed alkali solution was 200 pounds. It was kept at 20° C. out of contact with the air for four hours whereupon it was added to an autoclave and 250 pounds of ethyl chloride, and 800 pounds of tertiary amyl alcohol was added thereto. The reaction was carried out for five hours at 120° C. The product contained 42.5% ethoxy.

The length and width of the cellulose sheets employed in our invention may be those found most convenient. The width would best be governed by the width of the treating apparatus. Ordinarily, a sheet, having a 40 inch width, would be quite suitable.

The length of the sheet would depend upon the roll size which could be most readily handled. If the mixers are small, the weight of the roll might be from 25–100 pounds. If the mixers are of good size, the roll of cellulose sheet might be as great as 500 pounds. If desired, instead of having the entire charge for a reaction vessel in one sheet, smaller rolls might be employed with more than one roll set aside for each charge. Obviously, as the object of my invention is to cut down the amount of moisture, it is preferred that a cellulose, having a low moisture content such as of about 2% be used.

To determine the amount of alkali which is taken up by the cellulose, the roll can be weighed after the treatment and the difference in weight before and after treatment would tell the amount of alkali which was present. In this way the amount of alkali which would be further needed, could be determined.

In treating the cellulose with a hot solution of sodium hydroxide, having a high concentration, it is preferred to immediately cool the sheet to normal or below ordinary temperature and thereby prevent degradation of the cellulose or interference with the swelling action of the alkali upon the fibers. The sheet may be cooled after treatment, either by subjecting it to a stream of cold air or by passing the sheet over a chilled surface, such as a cold drum. In this way the sodium hydroxide crystallizes within the cellulose sheet and thereby forms a mixture of the cellulose and alkali.

We claim:

1. The method of preparing cellulose in sheet form for etherification which comprises passing over and contacting it with a surface wet with aqueous alkali, having a concentration of 40–70% whereby only ¼–2 parts of aqueous alkali is absorbed and subsequently forming the sheet into a roll in which form it remains until the time when it is etherified.

2. In the method of preparing cellulose ethers in which cellulose it preliminarily treated with alkali and then subjected to the action of an etherifying reagent under etherifying conditions the step which comprises passing an absorbent cellulose sheet having a low moisture content over and contacting it with a surface wet with aqueous alkali of 40–70% concentration, whereby only ¼–2 parts of aqueous alkali is absorbed, thereby preparing the cellulose sheet for its etherification without a pressing or squeezing out of some of the aqueous alkali being necessary.

3. A method of preparing cellulose ethers which comprises passing an absorbent cellulose sheet having a low moisture content over and contacting it with a surface moist with approximately saturated aqueous alkali, whereby only ¼–2 parts of aqueous alkali is absorbed, thereby preparing the sheet for its etherification and subsequently treating the sheet with a mixture of alkyl chloride and further alkali under etherifying conditions.

CARL J. MALM.
LORING W. BLANCHARD, Jr.